(12) United States Patent
Levchik et al.

(10) Patent No.: US 6,569,928 B1
(45) Date of Patent: May 27, 2003

(54) PHOSPHORUS-CONTAINING FIRE RETARDANT THERMOPLASTIC POLYESTER COMPOSITION

(75) Inventors: Sergei V. Levchik, Croton-on-Hudson, NY (US); Danielle A. Bright, New City, NY (US); Gerald R. Alessio, Emerson, NJ (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/913,928

(22) PCT Filed: Feb. 18, 2000

(86) PCT No.: PCT/US00/04159

§ 371 (c)(1),
(2), (4) Date: Jan. 4, 2002

(87) PCT Pub. No.: WO00/49077

PCT Pub. Date: Aug. 24, 2000

Related U.S. Application Data

(63) Continuation-in-part of application No. 09/253,214, filed on Feb. 19, 1999, now abandoned.

(51) Int. Cl.$^7$ .................................. C08K 3/32
(52) U.S. Cl. ................. 524/115; 524/126; 524/127; 524/594; 524/605; 525/437; 525/400
(58) Field of Search ................. 524/126, 115, 524/127, 594, 605; 525/437, 400

(56) References Cited

U.S. PATENT DOCUMENTS

| | | | |
|---|---|---|---|
| 3,697,459 A | * | 10/1972 | Dannels et al. |
| 4,010,144 A | * | 3/1977 | Dannels et al. |
| 4,070,336 A | * | 1/1978 | Birum |
| 4,073,767 A | * | 2/1978 | Birum |
| 4,073,829 A | * | 2/1978 | Moedriter |
| 4,105,825 A | * | 8/1978 | Heath et al. |
| 4,203,888 A | * | 5/1980 | Rashbrook |
| 4,212,832 A | * | 7/1980 | Mitschke et al. |
| 4,257,931 A | * | 3/1981 | Granzow |
| 4,268,459 A | * | 5/1981 | Hoffman |
| 4,278,591 A | * | 7/1981 | Granzow |
| 4,388,431 A | * | 6/1983 | Mauric et al. |
| 4,910,240 A | * | 3/1990 | Weil et al. |
| 4,970,249 A | * | 11/1990 | Joswig et al. |
| 5,457,221 A | * | 10/1995 | Brady et al. |
| 5,750,756 A | * | 5/1998 | Bright et al. |

FOREIGN PATENT DOCUMENTS

| | | | | |
|---|---|---|---|---|
| DE | 4005376 | * | 8/1991 | |
| EP | 791634 | * | 9/1997 | |
| EP | 889094 | | 1/1999 | ........... C08L/67/02 |
| JP | 60/137646 | * | 7/1985 | |
| JP | 07-053879 | * | 2/1995 | |
| WO | 97/31980 | * | 9/1997 | |

OTHER PUBLICATIONS

Antony et al. Synthesis and Thermal Characterization of Chemically Modified Cardanol polymers, Journal of Applied Polymer Science, 49 (1993), 2129–2135.*
Weil "Phosphorus–Containing Polymer", Kirk–Othmer Encyclopedia of Polymer Science and Engineering, vol. 11, John Wiley, NY, 1990, pp. 96–126.*
Mandal et al., "Polycyclic Phosphinate Resins: Thermally Cross–linkable Intermediates for Flame–Retardant Materials", Journa of Polymer Science: Part A: Polymer Chemistry, vol. 36, 1911–1918 (1998).*
Antony et al., "Synthesis and Thermal Characterization of Chemically Modified Phenolic Resins", Journal of Applied Polymer Science, vol. 54, 429–438 (1994).*
Patent Abstracts of Japan: Abstract of JP 8/208,884 (1996).

* cited by examiner

*Primary Examiner*—Robert Dawson
*Assistant Examiner*—Kuo-Liang Peng
(74) *Attorney, Agent, or Firm*—Richard P. Fennelly

(57) ABSTRACT

A fire retardant thermoplastic polyester comprising a phosphorus containing additive and a high charring polymer containing benzene rings in its main polymer backbone and that has a softening point of no less than about 120° C. exhibits improved fire resistance and no plate out of fire retardant additive during aging.

9 Claims, No Drawings

PHOSPHORUS-CONTAINING FIRE RETARDANT THERMOPLASTIC POLYESTER COMPOSITION

This application is a continuation-in-part of Ser. No. 09/253,214 filed Feb. 19, 1999 now abandoned.

FIELD OF THE INVENTION

This invention relates to fire retardant thermoplastic polyesters, more particularly to poly(ethylene terephthalate) and poly(butylene terephthalate), which are fire retarded by organic phosphates or phosphonates in combination with a high charring polymer.

BACKGROUND OF THE INVENTION

Fire retardant performance of polyesters can be achieved by the incorporation of various types of additives. Typically, halogenated compounds, more specifically aromatic polybrominated compounds, have been used as fire retardant additives in such polymers. It is generally accepted that these products inhibit radical gas phase reactions occurring in the flame when these products are ignited. This makes halogenated fire retardants very commonly used additives for different types of polymeric materials including polyesters. However, during the last ten years or so, halogenated flame retardants have come under scrutiny because of ecological concern, especially in Europe. At this time, the fire retardant industry is under pressure to switch to fire retardant additives that are perceived to be more environmentally friendly.

Phosphorus containing products are logical substitutes for such halogenated flame retardants. In some applications, phosphorus containing additives show as high an activity as the halogenated ones, but phosphorus containing additives are less commonly employed. They provide fire retardant activity through a combination of condensed phase reactions, polymer carbonization promotion, and char formation. These processes obviously depend on the polymer in which such additive(s) reside. Therefore, specific phosphorus containing structures need to be designed for various polymers types.

There is significant description in the prior art relating to methods of incorporating phosphorus containing additives into thermoplastic polyesters. Examples that are relevant to the present invention, but which are non-suggestive of it, are described in: U.S. Pat. Nos. 4,070,336; 4,073,767; 4,203,888; 4,257,931; 4,268,459; 4,278,591; 4,388,431; and 4,910,240; in European Patent Publication No. 791,634, and in PCT International Patent Publication No. WO 97/31 980. However, such phosphorus containing additives have limited solubility in polyesters and therefore they tend to migrate to the polymer surface. This migration phenomenon affects adversely the surface appearance and the combustion performance of the polymer product. Numerous attempts to solve this problem by copolymerization of phosphorus containing units into the polyesters chains (see, for example, E. D. Weil, Phosphorus-Containing Polymers, in the Kirk-Othmer Encyclopedia of Polymer Science and Engineering", Vol. 11, John Wiley, New York, 1990, pp. 96–126) were not commercially successful because of their high cost and a decrease in the physical properties of the resulting polymer.

Another approach reported in the prior art deals with the preparation of polymeric additives (see, for example, U.S. Pat. Nos. 4,073,829 and 4,970,249) or the grafting of phosphorus containing groups onto a commercially available polymer different from the polyester, e.g., a phenyl-formaldehyde resin (U.S. Pat. Nos. 3,697,459, 4,010,144, or 4,105,825; or German Patent Publication No. 4,005,376; or Japanese Patent Publication No.60/137,646; or as described in R. Antony et al., J. Appl. Polym. Sci., 49 (1993) 2129–2135; R. Antony et al., J. Appl. Polym. Sci., 54 (1994) 429–438; H. Mandai et al., J. Polym. Sci., Polym. Chem., 36 (1998) 1911–1918).

More recently, Japanese Patent Publication No. 10-195283 described flame retardant polyester compositions that contained a particular phosphoric ester flame retardant, a novolak phenolic resin, and a metal oxide additive. In the Comparative Examples that were provided in this patent document, especially Examples 1–2, 5–6 and 8, it was demonstrated that polyester resin compositions containing only the phosphoric ester flame retardant and the phenolic resin did not achieve a V0 rating. The phenolic resin used in these Examples has a softening point of only about 110° C.

SUMMARY OF INVENTION

The present invention relates to a polyester composition that shows high fire resistance because of the incorporation therein of a phosphorus containing fire retardant additive and a high charring polymer that has a softening point of no less than about 120° C. The phosphorus containing fire retardant additive does not migrate to the surface of the polymer to any appreciable degree. The high charring polymer makes it possible to dissolve the phosphorus containing additives and also provides synergistic fire retardant effect with the phosphorus containing additive.

DETAILED DESCRIPTION OF THE INVENTION

The term "thermoplastic polyester", as used herein, is intended to include any polymeric thermoplastic material composed (apart from carbons) of only ester —O—C(O)— groups in the main chain. More particularly, this invention is related, in its preferred embodiment, to the two most commonly used thermoplastic polyesters: poly(butylene terephthalate) and poly(ethylene terephthalate).

The phosphorus containing additives which are used to fire-retard thermoplastic polyesters are either diphosphates or oligomeric phosphates of the general formula:

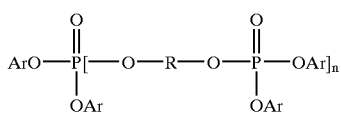

where R is a linear, branched or cyclic $C_2$ to $C_{15}$ alkylene group, phenylene, or bisphenylene with an alkylene, ether or sulfone bridge, Ar is an unsubstituted or substituted phenyl group, and where n can range from about 1 to about 10. This type of product is described in: U.S. Pat. Nos. 4,203,888, 4,212,832, 5,457,221, and 5,750,756, PCT International patent Publication No. WO 97/31 980 and European Patent Publication No. 791,634.

Another type of phosphorus containing additives applicable for use in the present invention are diphosphonates of the general formula:

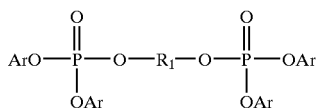

where $R_1$ is linear, branched or cyclic $C_2$ to $C_{15}$ alkylene or dialkylene ether and Ar is defined as above. This type of products is described in U.S. Pat. No. 4,910,240.

The term "high charring polymer" is intended to include those polymers that contain benzene rings in the main polymer backbone, that tend to produce a significant amount of char upon thermal decomposition, and that have a softening point of no less than about 120° C. Typical commercial examples of such polymers are phenol-formaldehyde resins (including different types of substituted phenols and diphenols), polycarbonates, polyphenylenethers, polyimides, polysulfones, polyethersulfones, polyphenylene sulfides, polyetheretherketones ets. Thermoplastic polyesters (such as PBT, PET), although containing benzene ring in the main chain, do not belong to the high charring class of polymers because they tend to depolymerize and volatilize instead of charring upon heating.

The phosphorus containing fire retardant should be present at a level of at least 5% by weight of the substrate polymer and the phenol-formaldehyde resin should be present at a level of at least 5% by weight. Preferred levels for both are from 5% to about 20%, and from about 5% to about 30%, respectively. The composition can contain one or more other functional additives that are normally employed, including: anti-drip agents; dispersants; toughening agents; and processing aid additives. Charring catalysts, including the type of metal oxide described in Japanese Patent Publication No. 10-195283, may be further added to the present compositions although the instant compositions perform in an acceptable manner in the substantial absence of such a metal oxide charring catalyst.

The present invention is further illustrated by the Examples that follow.

EXAMPLES

Procedure for making samples: In general, fire retardant polyester formulations were prepared by extrusion of the resin using a twin-screw extruder. Solid fire retardant additives were blended with the basic resin before extrusion and then fed together into the extruder. Liquid additives were pumped into the second heated zone of the extruder. The extruded resin formulation was quenched in water and pelletized. Standard bars for combustion test were prepared by injection molding of thoroughly dried formulation.

Origin of the materials used: Poly(butylene terephthalate) resin (PBT) was Valox 325 brand, Bisphenol A polycarbonate (PC) was Lexan 101 brand and poly-2,6-dimethyphenylene ether (PPO) was BHPP 820 brand all from General Electric. Phenol-formaldehyde resin was HRJ 12700 brand (melt or softening point: 125°–135° C.) from Schenectady International. Polytetrafluoroethelene (PTFE) was Teflon 6C brand from DuPont. Resorsinol bis(diphenyl phosphate) was Fyrolflex RDP brand and bisphenol A bis (diphenyl phosphate) was Fyrolflex BDP brand, both from Akzo Nobel Chemicals Inc. Melamine cyanurate was Fyrol MC brand and melamine phosphate was Fyrol MP brand, both also from Akzo Nobel Chemicals Inc. Resorsinol bis(diphenyl phosphate) with a high content of oligomeric molecules ("OligoRDP") was prepared according to the procedure described in U.S. Pat. No. 5,457,221. Ethylene bis(diphenyl phosphonate) (EDPh) and butylene bis (dipheny phosphonate) (BDPh) were prepared according to the procedure described in U.S. Pat. No. 4,910,240.

Estimation of plate out performance: The surface of the specimens was examined after injection molding. If some liquid was detected on the surface, it was assigned a "juicing" rating. If some powder was detected on the surface it was assigned to a "blooming" rating. If no liquid or powder was found, the specimens were aged in an oven at 70° C. and the surface was examined after 1, 2, 3, 5, 8 and 24 hours and then after each day till one month had elapsed.

Combustion test: The fire retardant performance of the polyester plastics was determined according to UL-94 protocol (vertical setup), which is described by J. Troitzsch, International Plastics Flammability Handbook, $2^{nd}$ edition, Hanser Publishers, Munich, 1990.

Examples: The following Table shows the results of plate out observations and combustion tests. Both types of phosphorus containing additives (phosphates and phosphonates) tend to plate out from the PBT based formulations. Melamine cyanurate (FYROLFLEX MC brand), polycarbonate (PC) and polyphenylene ether (PPO) help to prevent juicing after injection molding, however the samples start to juice after a short time at 70° C. These co-additives and also melamine phosphate (FYROL MP brand) show little effect, if any in improving fire retardancy. Co-addition of novolac helps improve fire retardancy and decrease or completely prevent juicing or blooming (see Example Nos. 3, 7, 9, 12, 17)

| Description | Example # | | | | | | | | | | | | | | | | |
| --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 | 17 |
| Composition, % wt. | | | | | | | | | | | | | | | | | |
| PBT | 85 | 75 | 74.5 | 84.9 | 74.9 | 75 | 74.9 | 74.5 | 74.7 | 74.7 | 74.7 | 74.9 | 75 | 74.9 | 74.5 | 74.7 | 74.7 |
| Fyrolflex RDP | 15 | 15 | 15 | | | | | | | 12.5 | 12.5 | | | | | | |
| Fyrolflex BDP | | | | 15 | 25 | 15 | 15 | | | | | | | | | | |
| Fyrolflex MC | | 10 | | | | 10 | | 10 | | | | | 10 | 12.5 | 10 | | |
| Fyrolflex MP | | | | | | | | | | | | | | | | 10 | |
| Oligo RDP | | | | | | | | 15 | 15 | | | | | | | | |
| EDPh | | | | | | | | | | | | 15 | | | | | |
| BDPh | | | | | | | | | | | | | 15 | 12.5 | 15 | 15 | 15 |
| Novolac | | | 10 | | | | 10 | | 10 | | | 10 | | | | | 10 |

-continued

| Description | \multicolumn{17}{c}{Example #} |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 |
| PC |  |  |  |  |  |  |  |  |  | 12.5 |  |  |  |  |  |  |  |
| PPO |  |  |  |  |  |  |  |  |  |  | 12.5 |  |  |  |  |  |  |
| PTFE |  |  | 0.5 | 0.1 | 0.1 |  | 0.1 | 0.5 | 0.3 | 0.3 | 0.3 | 0.1 |  | 0.1 | 0.5 | 0.3 | 0.3 |
| Combustion performance (UL94) |  |  |  |  |  |  |  |  |  |  |  |  |  |  |  |  |  |
| 1/8" samples | F | V2 | V0 | V2 | V2 | V2 | V0 | V2 | V0 | F | F | V0 | V2 | V2 | F | F | V0 |
| 1/16" samples |  | V2 |  | F | V2 | V2 | V2 |  | V1 | F | F | V1 |  | V2 |  | F | V0 |
| Plate out behavior |  |  |  |  |  |  |  |  |  |  |  |  |  |  |  |  |  |
| After injection molding | Y | Y | N | Y | Y | N | N | N | N | N | N | N | N | N | N | N | N |
| Aging at 70° C. |  |  | 3 h |  |  | 2 h | >30 d | 1 h | >30 d | 3 h | 3 h | 6 d | 4 d | 3 d | 3 d | 1 d | >30 d |

We claim:

1. A fire retardant polyester formulation containing an effective amount of phosphorus-containing fire retardant and a high charring polymer containing benzene rings in its main polymer backbone, which has a softening point of no less than about 120° C., and which is present in an amount no less than 5%, by weight of the polyester, for fire retardancy and non-migration of the fire retardant to the surface of the polymer.

2. The composition of claim 1 where the polyester is poly(butylene terephthalate).

3. The composition of claim 1 where the fire retardant is an organic phosphate.

4. The composition of claim 1 where the fire retardant is an organic phosphonate.

5. The composition of claim 1 where the high charring polymer is a phenol-formaldehyde resin.

6. The composition of claim 2 where the phosphate is an aromatic oligomeric phosphate.

7. The composition of claim 4 where the phosphonate is a bisphosphonate.

8. The composition of claim 1 where the phosphorus containing fire retardant is present at a level of at least 5% wt. and phenol-formaldehyde resin at a level of at least 5% wt.

9. The composition of claim 1 where the polyester is poly(ethylene terephthalate).

* * * * *